(12) United States Patent
Nihei et al.

(10) Patent No.: US 7,339,369 B2
(45) Date of Patent: Mar. 4, 2008

(54) MAGNETIC ENCODER

(75) Inventors: Yuji Nihei, Mohka (JP); Yasunori Abe, Mohka (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 11/564,115

(22) Filed: Nov. 28, 2006

(65) Prior Publication Data

US 2007/0126417 A1 Jun. 7, 2007

(30) Foreign Application Priority Data

Dec. 2, 2005 (JP) .............................. 2005-348647

(51) Int. Cl.
*G01B 7/14* (2006.01)
(52) U.S. Cl. ......................... 324/207.21; 324/207.24; 324/207.22
(58) Field of Classification Search ............................... 324/207.12–207.25
See application file for complete search history.

(56) References Cited

U.S. PATENT DOCUMENTS

| | | | | | |
|---|---|---|---|---|---|
| 3,993,946 | A | * | 11/1976 | Makino .................. | 324/207.21 |
| 5,198,762 | A | * | 3/1993 | Shimoe et al. .......... | 324/207.21 |
| RE34,443 | E | * | 11/1993 | Takahashi et al. ...... | 324/207.21 |
| 5,680,042 | A | * | 10/1997 | Griffen et al. .......... | 324/207.21 |
| 6,300,758 | B1 | * | 10/2001 | Griffen et al. .......... | 324/207.21 |
| 7,253,611 | B2 | * | 8/2007 | Ma et al. ................. | 324/207.2 |

FOREIGN PATENT DOCUMENTS

| | | |
|---|---|---|
| JP | B-2812042 | 8/1998 |
| JP | B-3040750 | 3/2000 |

* cited by examiner

*Primary Examiner*—Jay M Patidar
(74) *Attorney, Agent, or Firm*—Sughrue Mion, PLLC

(57) ABSTRACT

A magnetic encoder having a magnetic sensor composed of SVGMR elements, in which a signal output with a cycle equal to or less than a third of a cycle of magnetic patterns on a magnetic medium. The magnetic encoder comprises the magnetic medium, on which first magnetic regions and second magnetic regions are oppositely magnetized along the medium extending and disposed successively and alternately with each other, and the sensor that has three SVGMR elements or more and is movable relatively to the medium along the medium extending. Magnetizations of pinned magnetization layers of all the SVGMR elements are directed in the same direction along the medium extending. The SVGMR elements in the sensor are apart from each other along the medium extending by a length p, defined by 1/(the number N of the SVGMR elements in the sensor) of the sum of a first magnetic region length plus a second magnetic region length, and the SVGMR elements in the sensor are connected in series so that a cycle of resistance change of the sensor is 1/N of a cycle length of magnetic patterns on the medium, and the signal output with high resolution can be obtained.

4 Claims, 8 Drawing Sheets

MAGNETIC ENCODER

BACKGROUND OF THE INVENTION

1. Field of the Invention

The present invention relates to a magnetic encoder using a magnetic sensor with a spin-valve type giant magneto-resistance effect film.

2. Description of the Related Art

In recent years, a magnetic encoder applied to civil appliances, such as small-sized robots, digital cameras and ink-jet printers, is required not only to be cheap and small-sized but also to have the high resolution and excellent gap output characteristics. In other words, it is required that a magnetic encoder is small-sized but does not need a processing circuit for doubling frequency of signal and also can maintain a stable output against gap variation during its operation. Further, low electric power consumption is required.

In a conventional magnetic encoder, magnetic resistors formed from an anisotropic magneto-resistance effect film (hereinafter referred to as "AMR element") are applied. The AMR elements are widely used, because electric resistance is changed by some percent by a magnetic field change in them even in a region of a relatively small magnetic field, and because their films are easily produced. However, it is necessary to thicken the film to 20 nm to 40 nm, in order to obtain a stable magneto-resistance effect for the AMR elements having NiFe alloy thin firm or NiCo alloy thin film. But, they are difficult to use, since electric resistance of the elements reduces due to the thicker film. If a width dimension of the AMR element is reduced to increase the resolution, a shape anisotropy (Hk) is increased together with an influence of the thicker film, and a sufficient electric resistance change cannot be obtained in a region of a weak magnetic field to cause an expected electric output. Because of the reason, it was difficult to enhance the resolution in a magnetic encoder using AMR elements. Increase of the resolution means narrowing pitches of the elements and/or magnetizations on a medium and also increase of the number of the electric output signals for a unit length.

Instead of the AMR elements, which are difficult to enhance resolution, an element using a coupled giant magneto-resistance effect film (hereinafter referred to as "coupled GMR elements") is disclosed in Japanese Patent 2812042. The coupled GMR element has an electric resistance variation ratio as much as twice to four times of the AMR element. In the coupled GMR elements described in Japanese Patent 2812042, an artificial lattice metallic film having some-ten layers of alternately laminated NiCoFe thin films and non-magnetic metal thin films is used. The multiple lamination of the ferro-magnetic thin films and the non-magnetic metal thin films leads to a large magneto-resistance variation ratio. However, it is difficult to accomplish a low electric power consumption, since the non-magnetic metal thin films are a good electrically conductive material and the electric resistance of the film is as low as a half to a third of that of an AMR element. The coupled GMR elements have an electric resistance variation ratio as much as 20% to 30%, but the electric resistance variation ratio can be obtained only by using them in a large magnetic field. By the reason, it was hard to use them in a relatively small magnetic field as in a magnetic encoder.

There is a spin-valve type giant magneto-resistance effect film as used in a magnetic head of a hard disk storage device (HDD), which is a film showing, in a region of a relatively small magnetic field, an electric resistance variation ratio as much as a coupled GMR element. As described in Japanese Patent 3040750, the spin-valve type giant magneto-resistance effect film is composed of a pinned magnetization layer, in which a magnetization direction is not changed by a variation on an external magnetic field (or magnetic flux) direction, a non-magnetic conductive layer and a free magnetization layer, in which a magnetization direction is changed following a variation of an external magnetic field. An element made from a spin-valve type giant magneto-resistance effect film (hereinafter referred to as "SVGMR element") has an electric resistance as large as five times to six times of that of the coupled GoM element, and reduction of electric power consumption is easily achieved when it is used for a magnetic sensor. Also, it can work in a region of a magnetic field as relatively small as 1 A/m to 160 A/m, that is, about 0.006 Oe to 20 Oe.

However, a magnetic encoder has a disadvantage that resolution is reduced by only a substitution of the SVGMR elements for AMR elements and coupled GMR elements. When the SVGMR elements are used with a magnetic medium alternately magnetized with N-poles and S-poles with a magnetized pitch $\lambda$, a signal has an output cycle of $2\lambda$ that is twice of the magnetized pitch. In other words, the resolution becomes a half. This is caused by a magneto-resistance variation characteristic, and the reduction in the resolution cannot be avoided in a conventional encoder structure.

This is because the SVGMR elements have characteristic that electric resistance of the elements changes when an external magnetic field is applied in the same direction as magnetizations of pinned magnetization layers in the elements, while it does not change when the external magnetic field is applied oppositely. Or, because the SVGMR elements have characteristic that electric resistance of the elements does not change when an external magnetic field is applied in the same direction as magnetizations of pinned magnetization layers in the elements, while it changes when the external magnetic field is applied oppositely. When a magnetic medium is magnetized with a magnetized pitch $\lambda$, a magnetic field direction changes for every $\lambda$. Because of that, electric resistance of SVGMR elements changes with a cycle of $2\lambda$ that is twice of the magnetized pitch. By contrast, using coupled GMR elements or AMR elements provides an electric signal of a cycle of $\lambda$. The coupled G(MR elements and AMR elements show maximum electric resistances in a state of no magnetic field, and the electric resistances reduce when an external magnetic field increases. That is, regardless of a magnetic field direction, a signal is caused by increase and decrease of magnetic field intensity. From the reason, an electric signal of the same cycle as the magnetized pitch $\lambda$ can be obtained. SVGMR elements have not been applied to a magnetic encoder because they hardly satisfy the high resolution that is demanded in a market. However, since the SVGMR elements show a magneto-resistance variation ratio as much as in coupled GMR elements in a region of a relatively small magnetic field and also an electric resistance as large as five times to six times that of the coupled GMR elements, it is hard to give up an advantage that a low electric power consumption can be easily accomplished by the SVGMR elements.

SUMMARY OF THE INVENTION

An object of the present invention is to provide a magnetic encoder, which comprises a magnetic sensor composed of SVGVR elements and a magnetic medium that has successively magnetizations alternately magnetized in opposite directions, that provides an electric signal having a cycle equal to or less than a third of a magnetized pattern cycle of the magnetic medium, a low electric power consumption in the magnetic encoder and a stable output property with respect to a gap variation.

A magnetic encoder according to the present invention comprises: a magnetic medium extending in a direction and having first magnetized regions and second magnetized regions, which are disposed successively and alternately with each other on the medium and magnetized oppositely to one another along the medium, and a magnetic sensor movable relatively to the medium along the medium extending. The first magnetized regions and the second magnetized regions have different length from one another, and a length of longer ones of them is denoted as λl and a length of shorter ones of them is denoted as λs. The magnetic sensor is composed of a first sensor and a second sensor. Each of the first and the second sensors is composed of SVGMR elements of the equal number N of three or more, which have a rectangular flat surface extending perpendicularly to the medium extending and are electrically connected in series. Each of the SVGMR elements in each of the first and the second sensors is apart by a length p defined by (λl+ λs)/N from another SVGMR element along the medium extending. One of the SVGMR elements of the first sensor is at a distance of p(½+n) along the medium extending from an SVGMR element in the second sensor, in which n is zero or a positive integer. Each of the SVGMR elements is a lamination of a pinned magnetization layer, a non-magnetic conductive layer and a free magnetization layer in their order, and the pinned magnetization layers in all the SVGMR elements have magnetizations in the same direction along the medium extending. The SVGMR elements show a minimum electric resistance, when an external magnetic field is applied to the SVGMR elements in the same direction as the magnetizations of the pinned magnetization layers of the SVGMR elements, and a maximum electric resistance, when an external magnetic field is applied to the SVGMR elements in the direction opposite to the magnetizations of the pinned magnetization layers of the SVGMR elements.

An electric terminal of the first sensor, that is, one of open electric terminals of the SVGMR elements forming the first sensor, is electrically connected to an electric terminal of the second sensor, that is, one of open electric terminals of the SVGMR elements forming the second sensor. A measurement voltage is applied between the other electric terminal of the first sensor, that is, the other of the open electric terminals of the SVGMR elements forming the first sensor, and the other electric terminal of the second sensor, that is, the other of the open electric terminals of the SVGMR elements forming the second sensor. A signal output is taken out from the connected electric terminals between the first sensor and the second sensor.

An SVGMR element shows a maximum resistance against an electric current flowing through the SVGMR element, when a magnetization of a free magnetization layer is anti-parallel to a magnetization of a pinned magnetization layer in the SVGMR element, while the SVGMR element shows a minimum resistance, when the magnetization of the free magnetization layer is parallel to the magnetization of the pinned magnetization layer in the SVGMR element. In an SVGMR element applicable to the present invention, a magnetization of a free magnetization layer is anti-parallel to a magnetization of a pinned magnetization layer in the state that an external magnetic field is not applied to the SVGMR element or is applied in the direction opposite to the magnetization of the pinned magnetization layer, and when the external magnetic field is applied in the same direction as the magnetization of the pinned magnetization layer, the magnetization of the free magnetization layer turns in the same direction as the external magnetic field, that is, as the magnetization of the pinned magnetization layer, and when the external magnetic field is increased to a sufficient strength, the magnetization of the free magnetization layer becomes parallel to the magnetization of the pinned magnetization layer, and the SVGMR element shows a minimum resistance. Alternatively, when an external magnetic field is not applied to an SVGMR element or is applied in the same direction as a magnetization of a pinned magnetization layer, a magnetization of a free magnetization layer is parallel to the magnetization of the pinned magnetization layer, and the SVGMR element shows a minimum resistance, and when the external magnetic field is applied in the direction opposite to the magnetization of the pinned magnetization layer, the magnetization of the free magnetization layer turns in the same direction as the external magnetic field, that is, in the direction opposite to the magnetization of the pinned magnetization layer, and then, when the external magnetic field becomes to a sufficient strength, the magnetization of the free magnetization layer is anti-parallel to the magnetization of the pinned magnetization layer, and the SVGMR element shows a maximum resistance.

In an SVGMR element, it is determined by materials of a pinned magnetization layer and/or a free magnetization layer and thickness of a non-magnetic conductive layer interposed between the pinned magnetization layer and the free magnetization layer whether a magnetization of the free magnetization layer is parallel or anti-parallel to a magnetization of the pinned magnetization layer in the state of no external magnetic field applied.

The magnetic encoder of the present invention may use a magnetic medium that is formed on a periphery or an end surface of a round disk or formed in a linear magnetic scale. Since a shape of a magnetic medium for a magnetic encoder is widely known, a detailed description is omitted here.

In the magnetic medium for the magnetic encoder of the present invention, it is necessary that the first magnetized region is different in length from the second magnetized region. When a high portion (a mountain) is formed in resistance by a longer region of the first and the second magnetized regions, overlap of the high portion of resistance with a neighboring high portion of resistance appears, and a difference in resistance between the overlapped high portion and a non-overlapped high portion develops. When a high portion (a mountain) is formed in resistance by a shorter region of the first and the second magnetized regions, a skirt of a high portion in resistance does not overlap a skirt of a neighboring high portion in resistance, so that a difference in resistance between a high portion and a low portion develops. But, when the first magnetized region has a length equal to the second magnetized region, a skirt of a high portion in resistance overlaps a skirt of a neighboring high portion in resistance so that a low portion in resistance does not appear, and a difference in resistance is reduced so that it is difficult to take out an output.

In the magnetic encoder of the present invention, each of the first and the second sensors is composed of N pieces of SVGMR elements, each of which is apart by p from another along the medium extending. When an SVGMR element is located to face a first magnetized region or a second magnetized region, a resistance of the SVGMR element changes from a minimum value R2 to a maximum value R1 to show a mountain of resistance. Since each of the sensors is composed of the N pieces of SVGMR elements that are connected in series and apart by p from another, a resistance mountain is caused with an interval p by the SVGMR elements, and a signal output from each of the first and the second sensors has a cycle of 1/N of a magnetic pattern cycle ($\lambda l+\lambda s$) of the magnetic medium.

Since the first sensor and the second sensor are apart by a distance p(½+n), expressed by a length p defined by ($\lambda l+\lambda s$)/N and a positive integer n including zero, from each other along the medium extending in the magnetic encoder of the present invention, a resistance pattern of the first sensor is different by ½·p in phase from that of the second sensor. Taking out a midpoint electric potential between the first sensor and the second sensor as a signal output, a bridge output can be obtained.

Furthermore, in the magnetic encoder of the present invention, it is preferable that a width w of each of the SVGMR elements along the medium extending is equal to or less than $\lambda s$.

A portion of a resistance changing has a length w in a resistance mountain of an SVGMR element that repeats with an interval p. Presuming that an SVGMR element shows a maximum resistance R1, when it is positioned to face a first magnetized region, and a minimum resistance R2, when it is positioned to face a second magnetized region, the SVGMR element has a resistance R2, since the SVGMR element faces the second magnetized region when it is w before a front edge of the first magnetized region. When it further approaches the first magnetized region from a location that is w before the front edge of the first magnetized region, a part of the SVGMR element comes to face the first magnetized region, and a magnetization of a free magnetization layer the SVGMR element begins to turn by an influence of the first magnetized region from a position where the magnetization of the free magnetization layer is parallel to that of the pinned magnetization layer. So, the resistance of the SVGMR element rises from the minimum value R2. When the extent of the SVGMR element facing the first magnetized region further increases, the resistance increases, and the magnetization of the free magnetization layer of the SVGMR element becomes anti-parallel to the magnetization of the pinned magnetization layer to make the resistance almost the maximum value R1, when the SVGMR element reaches a location where it completely faces the first magnetized region. The SVGMR element proceeds from the location w here it faces the first magnetized region to come to a location where it is w before a front edge of a second magnetized region. Further, the SVGMR element proceeds and a part of the SVGMR element comes to face the second magnetized region, where a magnetic field from the first magnetized region weakens so that the magnetization of the free magnetization layer of the SVGMR element begins to rotate from a position it is anti-parallel to the magnetization of the pinned magnetization layer, and the SVGMR element resistance decreases from the maximum value R1. When the SVGMR element further proceeds from a location it faces the first magnetized region and reaches a location it completely faces the second magnetized region, the magnetization of the free magnetization layer of the SVGMR element becomes parallel to the magnetization of the pinned magnetization layer, and the resistance becomes the minimum value R2, since a magnetic field from the first magnetized region comes not to work to the free magnetization layer of the SVGMR element. A length of a region where the resistance of the SVGMR element changes from the minimum value R2 to the maximum value R1 or from the maximum value R1 to the minimum value R2 is almost the same as the width w of the SVGMR element. The resistance of the SVGMR element changes in the same manner, even if it is the minimum value R2, when the SVGMR element is at a location the SVGMR element faces a first magnetized region, and is the maximum resistance R1, when the SVGMR element is at a location the SVGMR element faces a second magnetized region.

So, the SVGMR element resistance is the minimum value R2 at a location the SVGMR element faces a second/first magnetized region, and the resistance gradually rises from a location where it is w from an edge of a first/second magnetized region, although the SVGMR element faces the second/first magnetized region, and becomes almost the maximum value R1 at a location where the SVGMR element completely faces the first/second magnetized region. And when the SVGMR element resistance gradually decreases from a location where it is w before an edge of the second/first magnetized region although the SVGMR element faces the first/second magnetized region, and becomes the minimum value R2 at a location the SVGMR element completely faces the second/first magnetized region. Presuming that the first magnetized region has a longer magnetized region length $\lambda l$ and the second magnetized region has a shorter magnetized region length $\lambda s$, a skirt length of a resistance mountain of an SVGMR element is w, and a peak length of the resistance mountain is almost $\lambda l-w$ or $\lambda s-w$.

Whether the peak length of the resistance mountain of an SVGMR element is $\lambda l-w$ or $\lambda s-w$ is determined by a magnetization of a pinned magnetization layer of the SVGMR element being in the same direction as a magnetization of a second magnetized region or a first magnetized region. However, since the first magnetized region and the second magnetized region can be replaced with each other, it should be understood that the peak length of the resistance mountain can be $\lambda l-w$ and $\lambda s-w$. Here, since $\lambda l>\lambda s$ is presumed, if a shorter magnetized region length $\lambda s$ is less than w, the SVGMR element cannot completely face the shorter magnetized region and the resistance cannot be a maximum/minimum value. So, it is necessary that a width w of an SVGMR element is equal to or shorter than the shorter magnetized region length $\lambda s$.

In the magnetic encoder of the present invention, it is desirable that a longer magnetized region length $\lambda l$ is equal to or more than p+w, and a shorter magnetized region length $\lambda s$ is equal to or less than p-w.

When the longer magnetized region length $\lambda l$ is equal to or more than p+w in the magnetic encoder, it leads to $\lambda l-p-w \geq 0$. Incidentally, if a resistance mountain of an SVGMR element appears at a location facing the longer magnetized region, an SVGMR element advancing or retreating p from the above-mentioned SVGMR element has a resistance mountain at a location advancing or retreating p from the above-mentioned resistance mountain. Since a peak length of a resistance mountain of an SVGMR element is almost $\lambda l-w$, the two neighboring peaks of resistance mountains overlap each other with almost a length $\lambda l-p-w$. The value being zero or positive means that the two neighboring peaks overlap each other. And when plural SVGMR elements are connected in series in each sensor, a difference between a maximum value and a minimum value of the summation of the resistances can be made larger.

By contrast, when a resistance mountain of an SVGMR element appears at a location facing a shorter magnetic region, an SVGMR element advancing or retreating p from the above-mentioned SVGMR element has a resistance mountain at a location advancing or retreating p from a resistance mountain of the above-mentioned SVGMR element. A length from a skirt to the other skirt of a resistance mountain of each SVGMR element is λs+w. Since a length λs of the shorter magnetized region is equal to or less than p−w, the length λs+w from a skirt to the other skirt of a resistance mountain of an SVGMR element is contained in a length p. This means that skirts of two neighboring resistance mountains do not overlap each other. So, when plural SVGMR elements in each sensor are connected in series, a difference between a maximum value and a minimum value of the summation of the resistances can be made larger.

In the magnetic encoder of the present invention, it is preferable that an SVGMR element of the second sensor is located between two neighboring SVGMR elements of the first sensor. Since both the first and the second sensors are composed of the SVGMR elements of the equal number N, each of which is apart by p from another, a distribution width of the SVGMR elements in each sensor is p·(the number N of SVGMR elements−1). The distribution width of all SVGMR elements contained in the first and the second sensors can be narrowed by positioning an SVGMR element of the second sensor between two neighboring SVGMR elements of the first sensor.

According to the present invention, an electric signal having a cycle p, which is defined by 1/N of a cycle λl+λs of magnetic patterns of the magnetic medium, has been accomplished by a magnetic encoder having SVGMR elements. Also, since SVGMR elements of large electric resistance are used, a magnetic sensor of less electric power consumption has been realized. Furthermore, a large magneto-resistance variation ratio has been obtained in a region of relatively small magnetic field, and a magnetic encoder capable of obtaining a stable output property (gap property) against a variation of a gap between a magnetic sensor and a magnetic medium has been realized.

DETAILED DESCRIPTION OF THE PREFERRED EMBODIMENTS

Figure 1:
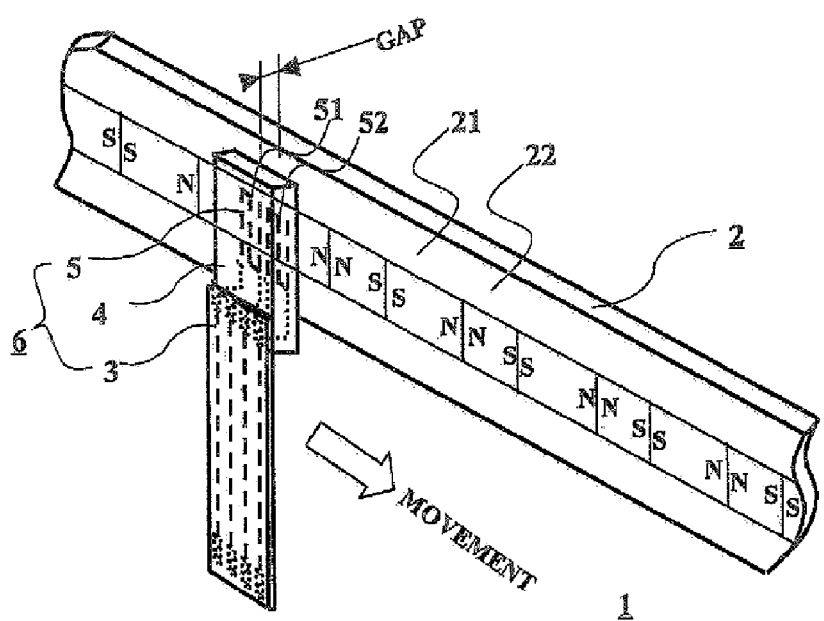
FIG. 1 is a perspective schematic view of a magnetic encoder using SVGMR elements according to the present invention.

Referring to the drawings, magnetic encoders of EXAMPLES according to the present invention will be described in details below. For convenience of understanding, the same numeral references will be used for the same parts and the same places. EXAMPLES will he explained, using a spin-valve type magneto-resistance effect film for SVGMR elements, in which a magnetization of a free magnetization layer is opposite to a magnetization of a pinned magnetization layer, and an electric resistance is high, when an external magnetic field is not applied, and the electric resistance of the SVGMR element reduces when an external magnetic field is applied to the SVGVR element in the same direction as the magnetization of the pinned magnetization layer of the SVGMR element, while the electric resistance of the SVGMR element does not change when an opposite external magnetic field is applied to the SVGMR element. When the magnetization of the free magnetization layer is in the same direction as the magnetization of the pinned magnetization layer, the electric resistance of the SVGMR element is minimum, while, when the magnetization of the free magnetization layer is opposite, a magneto-resistance change does not appear, and the electric resistance of the SVGMR element is maximum.

EXAMPLE 1

FIG. 1 shows a perspective schematic view for explaining a magnetic encoder having SVGMR elements. The magnetic encoder 1 is composed of a magnetic medium 2 and a magnetic sensor 6. On the magnetic medium 2, two magnetized regions, that is, first magnetized regions 21 and second magnetized regions 22, which are magnetized oppositely to each other, are arranged successively and alternately along the medium extending. In the following explanation, it is presumed that the length $\lambda l$ of the first magnetized regions 21 is longer than the length $\lambda s$ of the second magnetized regions 22. In the magnetic sensor 6, six SVGMR elements 5 are formed in rectangular flat surfaces extending perpendicularly to the magnetic medium 2 extending on a base material 4, and ends of the SVGMR elements 5 are connected through lead wires (not shown) to a flexible print circuit 3. Among the six SVGMR elements, three SVGMR elements electrically connected in series constitute a first sensor 51, and the other three SVGMR elements electrically connected in series constitute a second sensor 52. The magnetic medium 2 faces the SVGMR elements 5 having the rectangular flat surfaces with a predetermined gap. When the magnetic sensor moves relatively to the magnetic medium, a magnetic field being applied to the SVGMR elements varies and the resistances of the SVGMR elements change. In the following explanation, it is presumed that the magnetic medium is fixed and the magnetic sensor moves.

Figure 2:
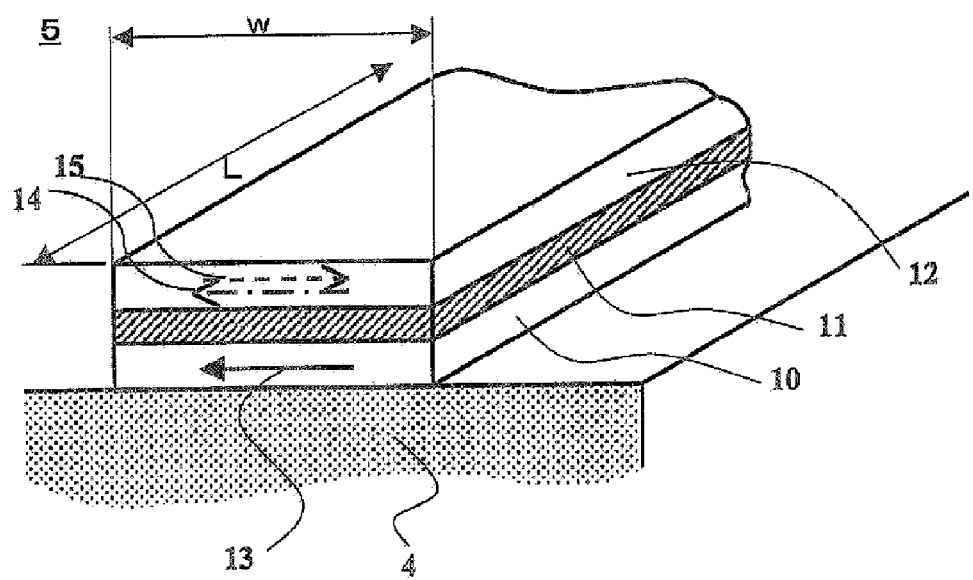
FIG. 2 is a schematic view explaining an SVGMR element used in the present invention.

In FIG. 2, the SVGMR element 5 is shown in a schematic view. In a manufacture of the SVGMR element 5, after laminating a pinned magnetization layer 10, a non-magnetic conductive layer 11 and a free magnetization layer 12 in the order on a base material 4, a resist-mask was made by a photolithograph, and a rectangular element was formed by ion milling. As the base material 4, aluminosilicate glass of thermal expansion coefficient $\alpha$ of $38\times10^{-7}$ deg.$^{-1}$ was used. The pinned magnetization layer 10 had a composition of $Co_{90}Fe_{10}$ (atomic %) and 5 nm in thickness on an anti-ferromagnetic layer of $Mn_{50}Pt_{50}$ (atomic %) and of 12 nm in thickness. The non-magnetic conductive layer 11 was copper and 3 nm in thickness. The free magnetization layer 12 was a two-layer film of $Ni_{85}Fe_{15}$ layer and $Co_{90}Fe_{10}$ layer and 5 nm in total thickness. The thickness ratio of $Ni_{85}Fe_{15}$ layer to $Co_{90}Fe_{10}$ layer was 3:1 to 5:1. The pinned magnetization layer 10 was sputtered im a magnetic field of about 240 A/m (about 30 Oe) to fix the magnetization. The NiFe layer in the free magnetization layer was sputtered in a magnetic field to make it magnetic anisotropy and to enhance the magnetic property.

After a resist-mask was formed by photolithograph technology on a spin-valve type giant magneto-resistance effect film made on the base material 4, SVGMR elements 5 were formed in an aimed shape by ion milling with argon ion. The SVGMR elements had almost rectangular shapes. In FIG. 2, the width of the rectangular SVGMR element is shown by w and the length is by L. The length L was made longer than the width of the magnetic medium, and the SVGMR elements were connected electrically in series outside of the magnetic medium width. By zigzagging the spin-valve type giant magneto-resistance effect film, the elements were connected. Since an external magnetic field is not applied to the connections of the elements, they do not show magneto-resistance variation.

Figure 3A:
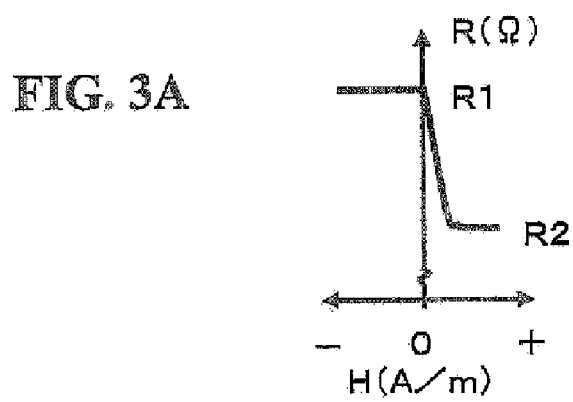
FIGS. 3A and 3B are graphs explaining a relationship between an electric resistance R and an external magnetic field H applied to an SVGMR element.
Figure 3B:
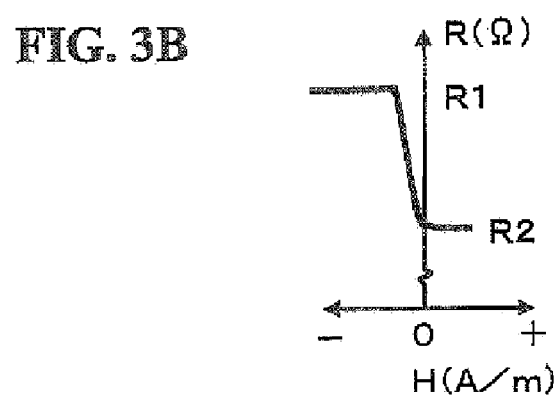
Figure 3C:
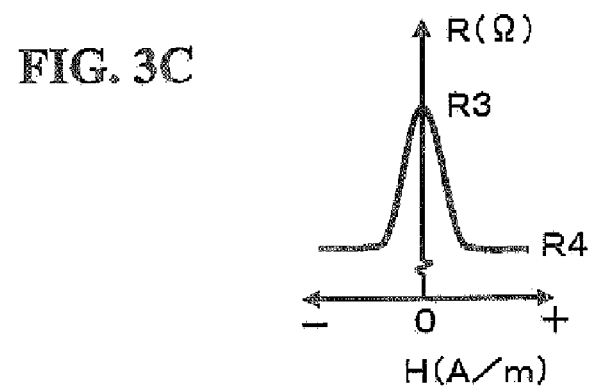
FIG. 3C is a graph explaining a relationship between an electric resistance R and an external magnetic field H applied to a coupled GMR element.
Figure 3D:
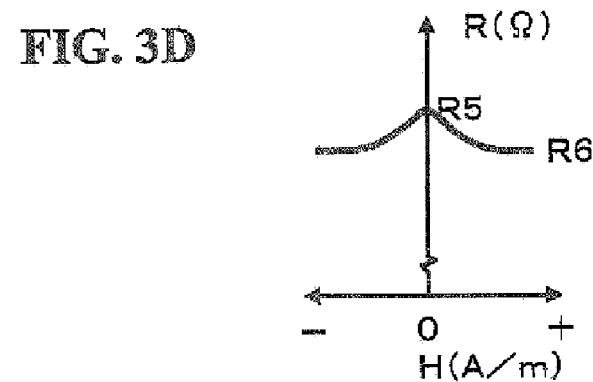
FIG. 3D is a graph explaining a relationship between an electric resistance R and an external magnetic field H applied to an AMR element.

A magnetization direction of the pinned magnetization layer 10 is shown by a solid arrow 13, while external magnetic field directions applied to the free magnetization layer 12 are shown by a dot-chain arrow 14 and a dotted arrow 15. Since the external magnetic field applied in the dot-chain arrow 14 is in the same direction as the magnetization of the pinned magnetization layer, an electric resistance of the SVGMR element 5 reduces according to the external magnetic field increasing. When the external magnetic field is applied in the dotted arrow 15, the magnetic field is opposite to the magnetization of the pinned magnetization layer, and the electric resistance of the SVGMR element 5 does not change. FIG. 3 shows relationships between electric resistances R and an external magnetic field H. FIG. 3A is a resistance change when an external magnetic field is applied to an SVGMR element. The electric resistance of the SVGMR element is R1 when no magnetic field is applied, and the electric resistance reduces and is saturated at R2 when a magnetic field is applied in a plus direction, that is, in the same direction as the magnetization of the pinned magnetization layer. Even when a magnetic field applied in a minus direction, that is, in a direction opposite to the magnetization of the pinned magnetization layer, a magneto-resistance variation does not occur, and an electric resistance is maintained at R1. A value obtained by a formula (R1−R2)/R1×100 (%) is called a magneto-resistance variation ratio. FIG. 3B shows a relationship between a change of an electric resistance and an external magnetic field, using an SVGMR element, in which an electric resistance on an element does not change when the magnetic field is applied in the same direction as a magnetization of a pinned magnetization layer, and changes when the magnetic field is applied opposite to the magnetization of the pinned magnetization layer. The electric resistance of the SVGMR element is minimum when a magnetization of a free magnetization layer is in the same direction as the magnetization of the pinned magnetization layer, and when it is opposite, a magneto-resistance variation does not occur, and the electric resistance of the SVGMR element is maximum. For comparison, relationships between electric resistances and external magnetic fields of a coupled GMR (giant magneto-resistance effect) element and of an AMR (anisotropic magneto-resistance effect) element are shown in FIG. 3C and FIG. 3D, respectively. In the coupled GMR element and the AMR element, magneto-resistance variation occurs in both directions of an external magnetic field increasing and decreasing unlike the SVGMR element. Since the magneto-resistance variation occurs in both directions of the external magnetic field increasing and decreasing in such a way, an electric signal obtained has the same cycle as a unit magnetized region length $\lambda$, that is, a magnetization length of the magnetic medium. An initial electric resistance R3 (without an applied magnetic field) of a coupled GMR element is about 322$\Omega$, while an initial electric resistance R1 of an SVGMR element is about 1560$\Omega$ that is about five times the initial electric resistance of the coupled GMR element. The electric resistances R3 and R1 are examples of elements of 5 μm in element width w and 1000 μm in element length L. The difference in the initial electric resistances becomes a difference in electric power consumptions in magnetic sensors. The more the initial electric resistance, the less the electric power consumption in a magnetic sensor.

EXAMPLE 2

Referring to FIG. 4, in which a first magnetized region length $\lambda l$ is longer than a second magnetized region length $\lambda s$ on a magnetic medium 2, a work of a magnetic encoder will be described. FIG. 4A explains a location relationship between SVGMR elements 51a to 52c of a magnetic sensor 6 and the magnetic medium 2, and FIGS. 4B to 4G show graphs of electric resistances and an electric signal with respect to a location on the magnetic medium 2 where the SVGMR elements 51a to 52c are. Electric resistance graphs of an SVGMR element 51a of a first sensor 51, another SVGMR element 51b of the first sensor 51, a third SVGMR element 51c of the first sensor 51, the first sensor 51 composed of the SVGMR elements 51a to 51c, a second sensor 52 composed of SVGMR elements 52a to 52c are shown in FIGS. 4B, 4C, 4D, 4E and 4F, respectively. In the magnetic sensor 6, the six SVGMR elements 51a to 52c are disposed on a base material. Each of the SVGMR elements has an element width w, and an SVGMR element is at a distance p, determined by ($\lambda l+\lambda s$)/3, from another in each of the sensors. The second sensor 52 is shifted by p/2 after the first sensor 51. Arrow attached to each of the SVGMR elements means a magnetization of a pinned magnetization layer in FIG. 4A. In the magnetic medium 2, the first magnetized region 21 is magnetized oppositely to the second magnetized region 22 and longer than the second magnetized region 22. The length of the first magnetized region is denoted as $\lambda l$, and the length of the second magnetized region is denoted as $\lambda s$. A direction of a leakage magnetic field caused by each magnetic region is shown by a dotted arrow connecting both ends of each of the first and the second magnetic regions 21, 22 of the magnetic medium.

Figure 5:
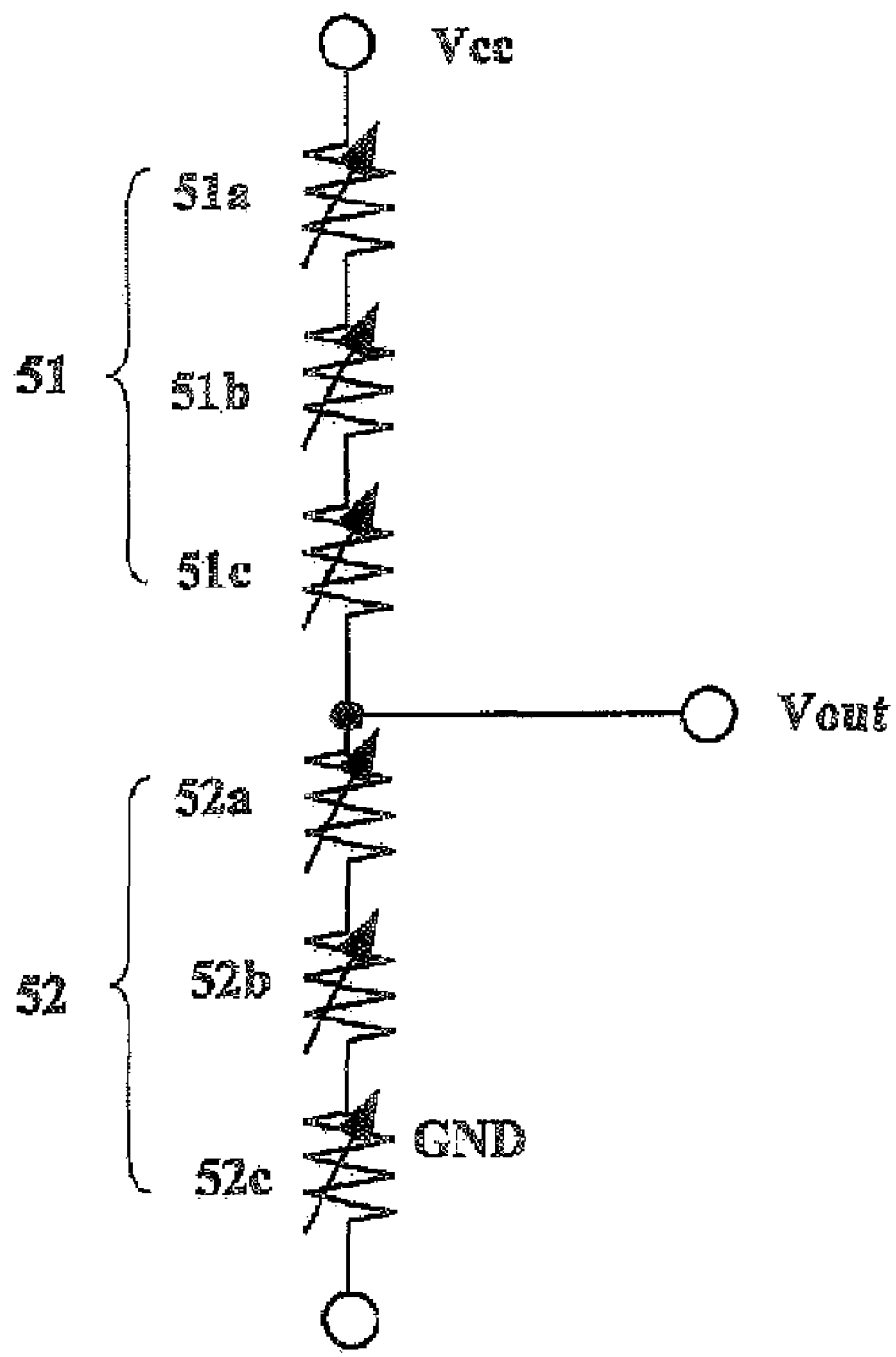
FIG. 5 is a view showing connections of the SVGMR elements in EXAMPLE 2 by an equivalent circuit.

FIG. 5 shows connections of the SVGMR elements 51a to 52c in an equivalent circuit. The SVGMR elements 51a to 51c in the first magnetic sensor 51 are connected in series, and in the same manner, the SVGMR elements 52a to 52c in the second magnetic sensor 52 are connected in series. A terminal of the SVGMR element 51c of the first magnetic sensor is connected to a terminal of SVGMR element 52a of the second magnetic sensor, and the connected terminal is connected to an output terminal to take out a midpoint electric potential Vout. The other terminal of the SVGMR element 51a of the first magnetic sensor 51 is connected to an electric source Vcc, and the other terminal of the SVGMR element 52c of the second sensor 52 is down to the ground.

Figure 4A:
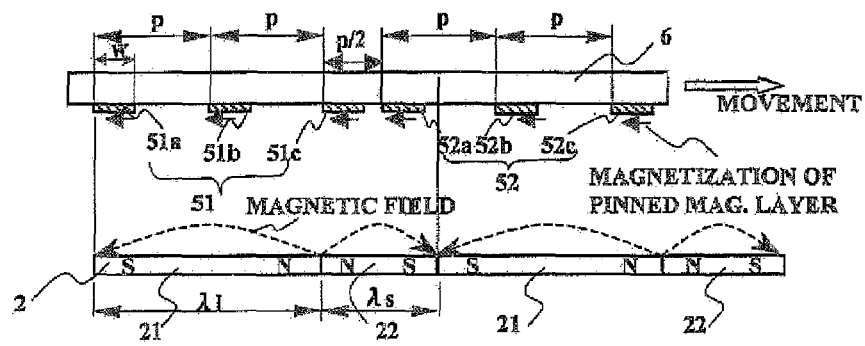
FIG. 4A is an explanatory view of a structure and a function of a magnetic encoder of EXAMPLE 2 of the present invention having a first and a second sensors, each of which is composed of three SVGMR elements, and a magnetic medium, in which a first magnetized region is longer than a second magnetized region.
Figure 4B:
FIG. 4B shows a graph explaining a relationship between an electric resistance of an SVGMR element in the first sensor and a location on the magnetic medium.
Figure 4C:
FIG. 4C shows a graph explaining a relationship between an electric resistance of another SVGMR element in the first sensor and a location on the magnetic medium.
Figure 4D:
FIG. 4D shows a graph explaining a relationship between an electric resistance of a third SVGMR element in the first sensor and a location on the magnetic medium.
Figure 4E:
FIG. 4E shows a graph explaining a relationship between an electric resistance of the first sensor and a location on the magnetic medium.
Figure 4F:
FIG. 4F shows a graph explaining a relationship between an electric resistance of the second sensor and a location on the magnetic medium.
Figure 4G:
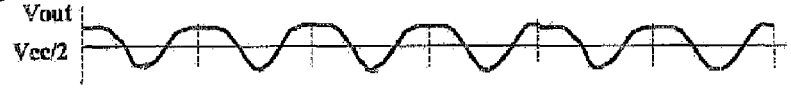
FIG. 4G is a graph explaining relationship between a midpoint electric potential output between the first and the second sensors and a location on the magnetic medium.

When the magnetic sensor 6 moves in the direction of the arrow in FIG. 4A, the SVGMR elements 51a to 51c receive a leakage magnetic field from the magnetic medium, the SVGMR element 51a changes in an electric resistance as shown in FIG. 4B, the SVGMR element 51b changes in an electric resistance as shown in FIG. 4C and the SVGMR element 51c changes in an electric resistance as shown in FIG. 4D. The maximum value of the electric resistance is set to R1, and the minimum value of the electric resistance is set to R2. FIG. 4E shows a composite electric resistance, which is equivalent to an electric resistance of the first sensor 51, of the SVGMR elements 51a to 51c. Although an electric resistance cycle of each of the SVGMR; element 51a in FIG. 4B, the SVGMR element 51b in FIG. 4C and the SVGMR element 51c in FIG. 4D is $\lambda l+\lambda s$, the composite electric resistance (see FIG. 4E) of the SVGMR elements 51a to 51c has a maximum resistance variation of R1−R2 and a cycle ($\lambda l+\lambda s$)/3, since the elements are disposed at a distance ($\lambda l+\lambda s$)/3 from each other. A composite electric resistance of a second sensor 52 is shown in FIG. 4F in the same manner. In FIG. 4F that advances in phase by p/2 from FIG. 4E, a midpoint electric potential Vout that is an output of the magnetic sensor 6 is an electric signal having a center voltage Vcc/2 of an amplitude and a cycle ($\lambda l+\lambda s$)/3. Since the output amplitude becomes larger with a larger difference between R1 and R2, an output can be larger when an element with a larger resistance variation like an SVGMR element is used. Using a configuration of SVGMR elements as in the present invention, in which an SVGMR element distance in each of the first and the second sensors is p that is a third of the sum of the first magnetized region length $\lambda l$ plus the second magnetized region length $\lambda s$, and in which a distance between the first and the second sensors is p/2 that is a half of the SVGMR element distance, a magnetic encoder of the high resolution has been accomplished, which has not been obtained only by a substitution of SVGMR elements for conventional elements.

As apparent from FIG. 4B, a resistance change region is almost the same as an SVGMR element width w. In the drawing, a range where the SVGMR element resistance is more than R2 has a length $\lambda s+w$ that is a sum of the second magnetized region length $\lambda s$ plus the SVGMR element width w. When the SVGMR element width w increases, the resistance mountain width is broadened, and a skirt of a resistance mountain of an SVGMR element of a sensor overlaps a skirt of a resistance mountain of another SVGMR element of the sensor. When skirts of resistance mountains overlap each other, the minimum value of resistance becomes larger than R2. Because of that, resistance variation in each SVGMR element becomes smaller than a resistance variation of the case of no skirt overlapping, to reduce an amplitude of the output Vout shown in FIG. 4G.

The overlap of skirts of resistance mountains is necessarily caused when the first and the second magnetized regions have the same length. So, it is necessary that the first magnetized region differs in length from the second magnetized region. In this EXAMPLE, three resistance mountain widths $3(\lambda s+w)$ of the three SVGMR elements are contained in a total length $\lambda l+\lambda s$ of the first magnetized region length $\lambda l$ and the second magnetized region length $\lambda s$. When the first magnetized region is longer than the second magnetized region, the overlapping of the skirts of the resistance mountains of the SVGMR elements reduces, and further when $\lambda l+\lambda s$ $(=3p) \geqq 3(\lambda s+w)$, the skirts of the resistance mountains of the SVGMR elements do not overlap each other.

EXAMPLE 3

Figure 6A:
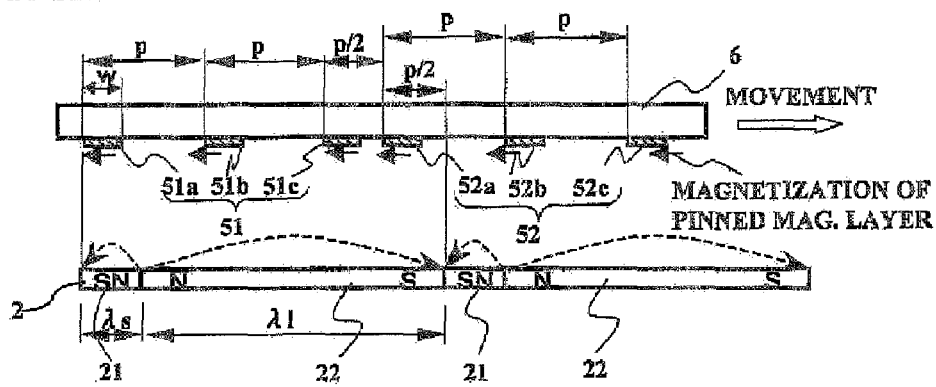
FIG. 6A is an explanatory view of a structure and a function of a magnetic encoder of EXAMPLE 3 of the present invention having a magnetic medium, in which a first magnetized region is shorter than a second magnetized region.

Referring to FIGS. 6A to 6G, a magnetic encoder of EXAMPLE 3 will be described, which is similar to the magnetic encoder of EXAMPLE 2 shown in FIG. 4A with an exception that a magnetic medium 2 has a first region shorter than a second magnetized region. FIG. 6A explains a location relationship between SVGMR elements 51a to 52c of a magnetic sensor 6 and the magnetic medium 2, and FIGS. 6B to 6G show graphs of electric resistances and an electric signal with respect to a location on the magnetic medium 2 where the SVGMR elements 51a to 52c are. Electric resistance graphs of an SVGMR element 51a of a first sensor 51, another SVGMR element 51b of the first sensor 51, a third SVGMR element 51c of the first sensor 51, the first sensor 51 composed of the SVGMR elements 51a to 51c, a second sensor 62 composed of SVGMR elements 52a to 52c are shown in FIGS. 6B, 6C, 6D, 6E and 6F, respectively. In the magnetic sensor 6, the six SVGMR elements 51a to 52c are disposed on a base material. Each of the SVGMR elements in each sensor has an element width w, and an SVGMR element is at a distance p, determined by $(\lambda l+\lambda s)/3$, from another in each of the first and the second sensors. The second sensor 52 is shifted by p/2 after the first sensor 51. Arrow attached to each of the SVGMR elements means a magnetization of a pinned magnetization layer in FIG. 6A. In the magnetic medium 2, the first magnetized region 21 is magnetized oppositely to the second magnetized region 22, and the first magnetized region 21 is shorter than the second magnetized region 22. The length of the first magnetized region is set to $\lambda s$, and the length of the second magnetized region is set to $\lambda l$. A direction of a leakage magnetic field caused by each magnetic region is shown by a dotted arrow connecting both ends of each of the first and the second magnetic regions 21, 22 of the magnetic medium 2.

Figure 6B:
FIG. 6B shows a graph explaining a relationship between an electric resistance of an SVGMR element in a first sensor and a location on the magnetic medium.
Figure 6C:
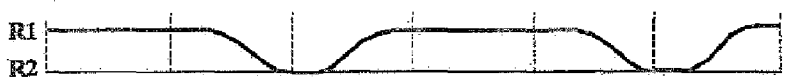
FIG. 6C shows a graph explaining a relationship between an electric resistance of another SVGMR element in the first sensor and a location on the magnetic medium.
Figure 6D:
FIG. 6D shows a graph explaining a relationship between an electric resistance of a third SVGMR element in the first sensor and a location on the magnetic medium.
Figure 6E:
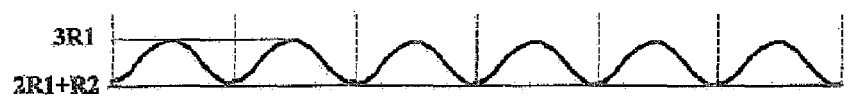
FIG. 6E shows a graph explaining a relationship between an electric resistance of the first sensor and a location on the magnetic medium.
Figure 6F:
FIG. 6F shows a graph explaining a relationship between an electric resistance of a second sensor and a location on the magnetic medium.
Figure 6G:
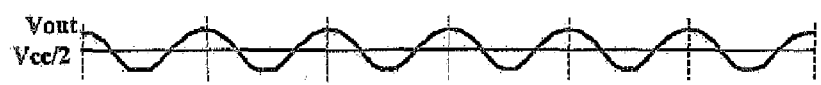
FIG. 6G is a graph explaining relationship between a midpoint electric potential output between the first and the second sensors and a location on the magnetic medium.

When the magnetic sensor 6 moves in the direction of the arrow in FIG. 6A, the SVGMR elements 51a to 51c receive a leakage magnetic field from the magnetic medium, the SVGMR element 51a changes in an electric resistance as shown in FIG. 6B, the SVGMR element 51b changes in an electric resistance as shown in FIG. 6C, and the SVGMR element 51c changes in an electric resistance as shown in FIG. 6D. The maximum value of the electric resistance is set to R1, and the minimum value of the electric resistance is set to R2. FIG. 6E shows a composite electric resistance, which is equivalent to an electric resistance of the first sensor 51, of the SVGMR elements 51a to 51c. Although an electric resistance cycle of each of the SVGMR element 51a in FIG. 6B, the SVGMR element 51b in FIG. 6C and the SVGMR element 51c in FIG. 6D is $\lambda l+\lambda s$, the composite electric resistance (see FIG. 6E) of the SVGMR elements 51a to 51c has a maximum resistance variation of R1–R2 and a cycle $(\lambda l+\lambda s)/3$, since the elements are disposed at a distance p from each other. A composite electric resistance of a second sensor 52 is shown in FIG. 6F in the same manner. In FIG. 6F that advances in phase by p/2 from FIG. 6E, a midpoint electric potential Vout that is an output of the magnetic sensor 6 is an electric signal having a center voltage Vcc/2 of an amplitude and a cycle $(\lambda l+\lambda s)/3$ as shown in FIG. 6G. Using a configuration of SVGMR elements explained above, a magnetic encoder of the high resolution has been accomplished, which has not been obtained only by a substitution of SVGMR elements for conventional elements.

EXAMPLE 4

Figure 7A:
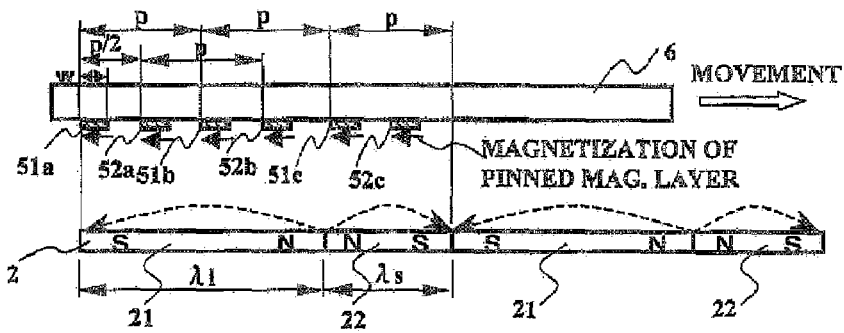
FIG. 7A is an explanatory view of a structure and a function of a magnetic encoder of EXAMPLE 4 according to the present invention having a magnetic sensor, in which a first SVGMR element of a second sensor is disposed between a first SVGMR element and a second SVGMR element of a first sensor.
Figure 7B:
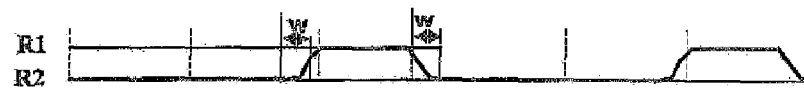
FIG. 7B shows a graph explaining a relationship between an electric resistance of an SVGMR element in the first sensor and a location on a magnetic medium.
Figure 7C:
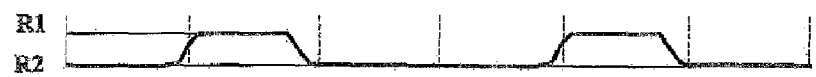
FIG. 7C shows a graph explaining a relationship between an electric resistance of another SVGMR element in the first sensor and a location on the magnetic medium.
Figure 7D:
FIG. 7D shows a graph explaining a relationship between an electric resistance of a third SVGMR element in the first sensor and a location on a magnetic medium.
Figure 7E:
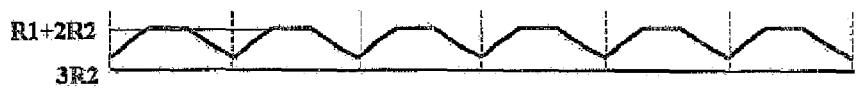
FIG. 7E shows a graph explaining a relationship between an electric resistance of the first sensor and a location on the magnetic medium.
Figure 7F:
FIG. 7F shows a graph explaining a relationship between an electric resistance of the second sensor and a location on the magnetic medium.
Figure 7G:
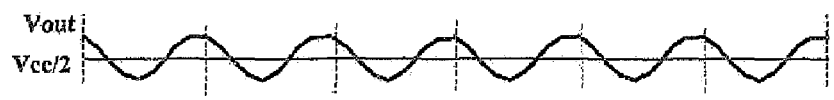
FIG. 7G is a graph explaining relationship between a midpoint electric potential output between the first and the second sensors and a location on the magnetic medium.

A magnetic encoder comprising a magnetic medium 2, in which a first magnetized region 21 is longer than a second magnetized region 22, and a magnetic sensor 6 having a structure, in which a first SVGMR element 52a of a second sensor is positioned between a first SVGMR element 51a and a second SVGMR element 51b of a first sensor, will be described as EXAMPLE 4, referring to FIG. 7. The first magnetized region length is set to $\lambda l$, and the second magnetized region length is set to $\lambda s$. As shown in FIG. 7A, an SVGMR element distance in each of the first and the second sensors is p that is determined by $(\lambda l+\lambda s)/3$, and the first SVGMR element 52a of the second sensor is shifted by p/2 from the first SVGMR element 51a of the first sensor. The second SVGMR element 51b of the first sensor is apart p/2 from the first SVGMR element 52a of the second sensor. And, each SVGMR element width is w. When the magnetic sensor 6 moves in an arrow direction, the SVGMR elements 51a to 51c receive a leakage magnetic field from the magnetic medium, and electric resistances in the SVGMR elements 51a, 51b and 51c change as shown in FIG. 7B, FIG. 7C and FIG. 7D, respectively. The maximum value of the electric resistance is set to R1, and the minimum value of the electric resistance is set to R2. A composite electric resistance of the SVGMR elements 51a to 51c, which is equivalent to an electric resistance of the first sensor, is shown in FIG. 7E. Although each electric resistance of the SVGMR elements 51a, 51b and 51c shown in FIG. 7B, FIG. 7C and FIG. 7D has a cycle $\lambda l+\lambda s$, the composite electric resistance of the SVGMR elements 51a to 51c has a maximum resistance variation of R1–R2 and a cycle $(\lambda l+\lambda s)/3$ (see FIG. 7E), since the elements are disposed at a distance p from each other. A composite electric resistance of the second sensor is shown in FIG. 7F in the same manner. In FIG. 7F advancing in phase by p/2 from FIG. 7E, a midpoint electric potential Vout that is an output of the magnetic sensor 6 is an electric signal having a center voltage Vcc/2 of an amplitude and a cycle $(\lambda l+\lambda s)/3$, as shown in FIG. 7G.

Since the first magnetized region length is longer than the second magnetized region length in this EXAMPLE 4 as in EXAMPLE 2, the electric resistances and the midpoint electric potential of the SVGMR elements 51a to 52c change in the same manner as in EXAMPLE 2, and the magnetic encoder of the high resolution has been obtained. In FIG. 7A, an element distribution length from a top SVGMR element 51a to an element 52c at the tail end is $\{2p+(p/2)+w\}$. By contrast, the SVGMR element distribution length was {2p+(p/2)+2p+w} in the magnetic sensor, in which the second sensor was disposed after the first sensor, shown in EXAMPLE 2. The magnetic sensor width can be made smaller by the configuration of EXAMPLE 4 and cheaper, since more magnetic sensors can be produced from a wafer. Also, miniaturization has been realized.

EXAMPLE 5

A magnetic encoder comprising a magnetic medium 2, in which a first magnetized region is shorter than a second magnetized regions, and a magnetic sensor 6, in which each of a first sensor 51 and a second sensor 52 has four SVGMR elements, will be described as EXAMPLE 5, referring to FIG. 8. The first sensor 51 is composed of the SVGMR elements 51a to 51d, and the second sensor 52 is composed of the SVGMR elements 52a to 52d. Each SVGMR element distance in the first and the second sensors is set to p that is determined by $(\lambda l+\lambda s)/4$ from the first magnetized region length $\lambda s$ and the second magnetized region length $\lambda l$, and the first SVGMR element 52a of the second sensor is disposed apart by p/2 from the fourth SVGMR element 51d of the first sensor.

Figure 9:
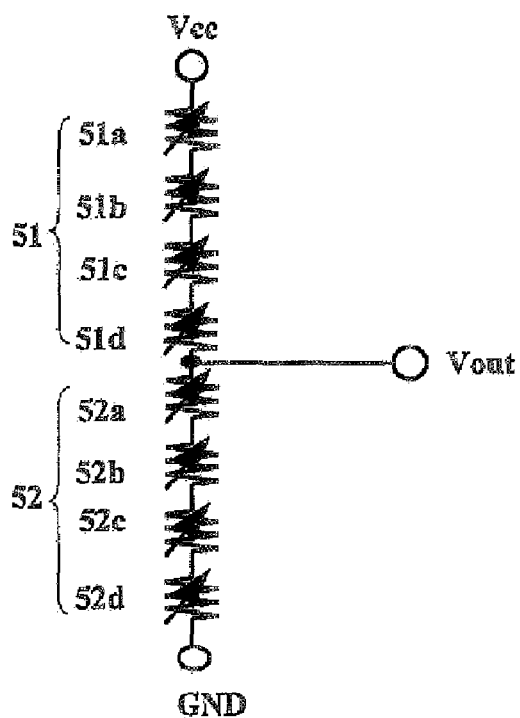
FIG. 9 is a view showing connections of the SVGMR elements in EXAMPLE 5 by an equivalent circuit.

FIG. 9 shows connections of the SVGMR elements 51a to 52d in an equivalent circuit. The SVGMR elements 51a to 51d in the first sensor 51 are connected in series, and in the same manner, the SVGMR elements 52a to 52d in the second sensor 52 are connected in series. A terminal of the SVGMR element 51d of the first sensor 51 is connected to a terminal of SVGMR element 52a of the second sensor 52, and the connected terminal is connected to an output terminal to take out a midpoint electric potential. The other terminal of the SVGMR element 51a of the first sensor 51 is connected to an electric source Vcc, and the other terminal of the SVGMR element 52d of the second sensor 52 is down to the ground.

Figure 8A:
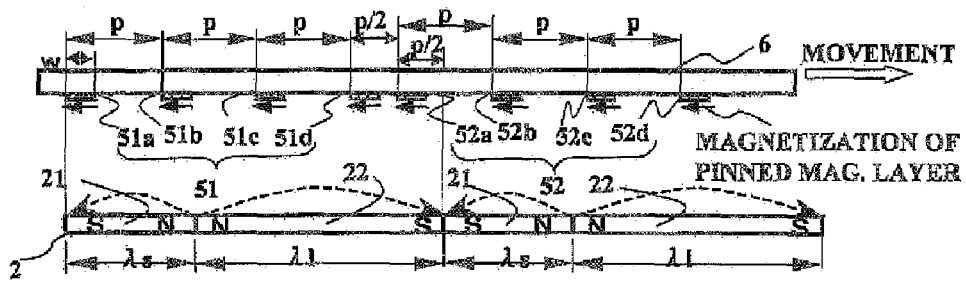
FIG. 8A is an explanatory view of a structure and a function of a magnetic encoder of EXAMPLE 5 according to the present invention having a magnetic sensor, in which each of a first and a second sensors of the magnetic sensor is composed of four SVGMR elements, and in which a first magnetized region is shorter than a second magnetized region.
Figure 8B:
FIG. 8B shows a graph explaining a relationship between an electric resistance of an SVGMR element in the first sensor and a location on a magnetic medium.
Figure 8C:
FIG. 8C shows a graph explaining a relationship between an electric resistance of another SVGMR element in the first sensor and a location on the magnetic medium.
Figure 8D:
FIG. 8D shows a graph explaining a relationship between an electric resistance of a third SVGMR element in the first sensor and a location on the magnetic medium.
Figure 8E:
FIG. 8E shows a graph explaining a relationship between an electric resistance of a forth SVGMR element in the first sensor and a location on the magnetic medium.
Figure 8F:
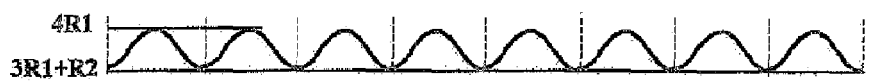
FIG. 8F shows a graph explaining a relationship between an electric resistance of the first sensor and a location on the magnetic medium.
Figure 8G:
FIG. 8G shows a graph explaining a relationship between an electric resistance of the second sensor and a location on the magnetic medium.
Figure 8H:
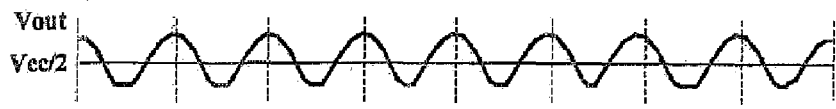
FIG. 8H is a graph explaining relationship between a midpoint electric potential output between the first and the second sensors and a location on the magnetic medium.

When the magnetic sensor 6 moves in an arrow direction in FIG. 8A, the SVGMR elements 51a to 51d of the first sensor receive a leakage magnetic field from the magnetic medium 2, the first SVGMR element 51a changes in electric resistance as shown in FIG. 8B, and the second SVGMR element 51b changes in electric resistance as shown in FIG. 8C, the third SVGMR element 51c changes in electric resistance as shown in FIG. 8D, and the forth SVGMR element 51d changes in electric resistance as shown in FIG. 8E. The maximum value of the electric resistance is set to R1, and the minimum value of the electric resistance is set to R2. FIG. 8F shows a composite electric resistance of the SVGMR elements 51a to 51d, which is equivalent to an electric resistance of the first sensor. And, FIG. 8G shows a composite electric resistance of the SVGMR elements 52a to 52d, which is equivalent to an electric resistance of the second sensor. Although an electric resistance cycle of each of the SVGMR elements 51a to 5d in FIGS. 8B to 8E is $\lambda l+\lambda s$, the composite electric resistance of the SVGMR elements 51a to 51d has a maximum resistance variation of R1−R2 and a cycle $(\lambda l+\lambda s)/4$, since they are disposed with an element distance $(\lambda l+\lambda s)/4$. In the same manner, a composite electric resistance of the second sensor has a cycle $(\lambda l+\lambda s)/4$ as shown in FIG. 8G and is p/2 in phase difference from the composite electric resistance shown in FIG. 8F. A midpoint electric potential Vout that is an output of the magnetic sensor 6 is an electric signal having a cycle $(\lambda l+\lambda s)/4$ as shown in FIG. 8H.

EXAMPLE 6

Figure 10:
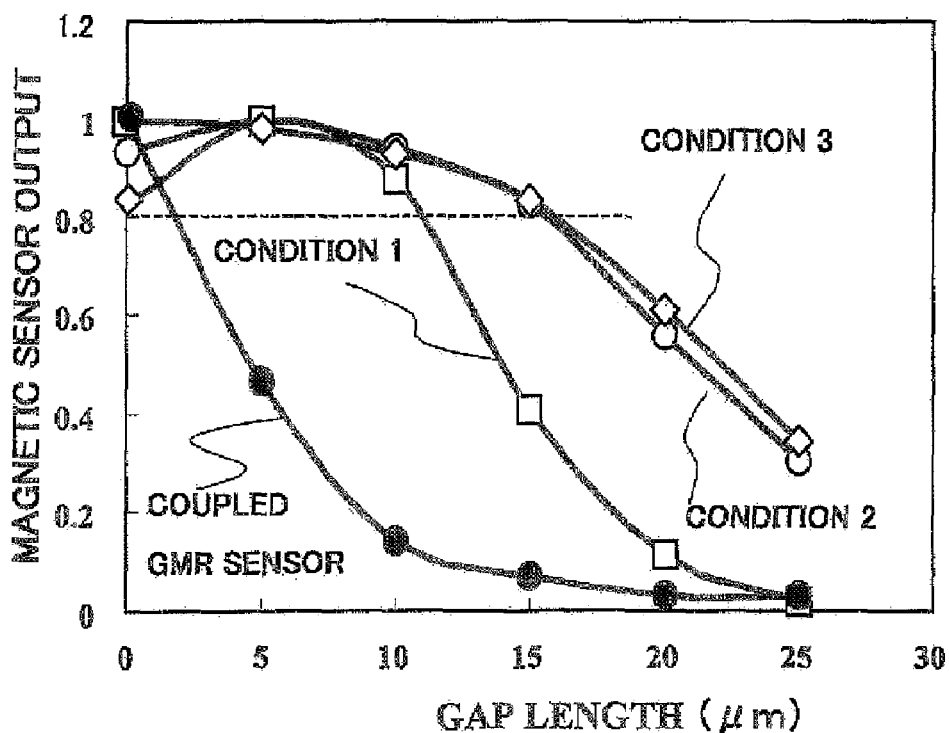
FIG. 10 is a graph showing a relationship (gap property) between a magnetic sensor output and a gap length in magnetic encoders according to the present invention having SVGMR elements and in a comparative magnetic encoder having coupled GMR elements.

In FIG. 10, a gap property of the magnetic encoder according to the present invention is shown. By changing a gap between a magnetic medium and a magnetic sensor with an interval of 5 μm from 0 μm to 25 μm, a relationship of a magnetic sensor output with respect to a gap length, that is, a gap property, was measured. In the magnetic sensors used here that were like those used in EXAMPLES 2 and 3, the second sensor was shifted by p/2 after the first sensor. Distances p between SVGMR elements in each sensor were 20 μm, and width w of the SVGMR element was 5 μm. A magnetic medium, in which the sum $\lambda l+\lambda s$ of the first magnetized region length plus the second magnetized region length was 60 μm, was used for a magnetic encoder having three SVGMR elements for each of the first and the second sensors. And, a magnetic medium, in which the sum $\lambda l+\lambda s$ of the first magnetized region length plus the second magnetized region length was 80 μm, was used for the magnetic encoder having four SVGMR elements for each of the first and the second sensors. The magnetic properties of a magnetic material used in the magnetic medium were coercive force Hc: 217 kA/m, residual magnetic flux density Br: 1.4 T and squareness R: 0.8. The measurements were carried out in Condition 1: the magnetic encoder having three SVGMR elements for each of the first and the second sensors was used, a first magnetized region was longer than a second magnetized region, and a length difference between them was w, Condition 2: the magnetic encoder having three SVGMR elements for each of the first and the second sensors was used, a first magnetized region was shorter than a second magnetized region, and a length difference between them was w, and Condition 3: the magnetic encoder having four SVGMR elements for each of the first and the second sensors was used, a first magnetized region was shorter than a second magnetized region, and a length difference between them was w. For comparison, a gap property about coupled GMR sensors was measured. In the coupled GMR sensors, a first magnetized region length was equal to a second magnetized region length, their lengths were 40 μm, and two GMR elements were disposed at a distance of 20 μm from each other.

The gap property was evaluated with a gap length range providing an output more than 80% of the maximum output. A vertical axis of FIG. 10 shows a ratio of an output to the maximum output set to 1 in each Condition. As apparent from FIG. 10, gap length ranges for sensors using SVGMR elements in all the Conditions are broader in comparison with the coupled GMR sensors. In the coupled GMR sensors, the magnetic sensor output sharply decreased when the gap became longer, and the gap length range providing output more than 80% was as small as 0 μm to 1.8 μm. In the sensors of SVGMR elements, the gap length range of Condition 1 was 0 μm to 11 μm, and the gap length range of about six times that of the coupled GMR sensors was obtained. The gap length ranges of Conditions 2 and 3 were 0 μm to 15.5 μm, which were about 8.6 times that of the coupled GMR sensors. The fact that a larger gap length range was obtained like this supports that the SVGMR elements work in a small magnetic field.

What is claimed is:

1. A magnetic encoder comprising:
   a magnetic medium extending in a direction and having first magnetized regions and second magnetized regions, which are disposed successively and alternately with each other on the medium and magnetized oppositely to one another along the medium extending, and a magnetic sensor movable relatively to the medium along the medium extending, wherein the first and the second magnetized regions are different in length from one another, of which a length of longer ones is denoted as $\lambda l$, and a length of shorter ones is denoted as $\lambda s$, wherein the magnetic sensor is composed of a first sensor and a second sensor, each of which is composed of SVGMR elements of the equal number N of three or more, which have a rectangular surface extending perpendicularly to the medium extending and facing the medium with a predetermined gap and are electrically connected in series, wherein each of the SVGMR elements in each of the first and the second sensors is apart by p defined by $(\lambda l + \lambda s)/N$ from another SVGMR element along the medium extending, wherein one of the SVGMR elements in the first sensor is at a distance of $p(\frac{1}{2}+n)$ from one of the SVGMR elements in the second sensor along the medium extending, wherein n is 0 or a positive integer, wherein each of the SVGMR elements is a lamination of a pinned magnetization layer, a non-magnetic conductive layer and a free magnetization layer in their order, the pinned magnetization layers in all of the SVGMR elements have magnetizations in the same direction along the medium extending, and the SVGMR elements show a minimum electric resistance, when an external magnetic field is applied to the SVGMR elements in the same direction as the magnetizations of the pinned magnetization layers of the SVGMR elements, and a maximum electric resistance, when an external magnetic field is applied to the SVGMR elements in the direction opposite to the magnetizations of the pinned magnetization layers of the SVGMR elements, and wherein an electric terminal of the first sensor is electrically connected to an electric terminal of the second sensor, and a signal output is taken out from the connected electric terminals between the first sensor and the second sensor, during a measurement voltage is applied between the other electric terminal of the first sensor and the other electric terminal of the second sensor.

2. A magnetic encoder as set forth in claim 1, wherein a width w of each of the SVGMR elements along the medium extending is equal to or less than $\lambda s$.

3. A magnetic encoder as set forth in claim 2, wherein $\lambda l$ is equal to or more than p+w, and $\lambda s$ is equal to or less than p−w.

4. A magnetic encoder as set forth in claim 3, wherein a SVGMR element of the second sensor is located between two neighboring SVGMR elements of the first sensor.

* * * * *